(12) United States Patent
Dietrich, Sr.

(10) Patent No.: US 7,143,837 B2
(45) Date of Patent: *Dec. 5, 2006

(54) SOIL CONDITIONING ROTARY REEL FOR SECONDARY TILLAGE OPERATIONS

(75) Inventor: William J. Dietrich, Sr., Goodfield, IL (US)

(73) Assignee: CNH America LLC, Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/965,398

(22) Filed: Oct. 14, 2004

(65) Prior Publication Data

US 2006/0081384 A1    Apr. 20, 2006

(51) Int. Cl.
*A01B 35/28* (2006.01)

(52) U.S. Cl. .................. 172/532; 172/540

(58) Field of Classification Search .......... 172/518, 172/527, 532, 537, 540, 542, 548, 549, 554, 172/555, 556
See application file for complete search history.

(56) References Cited

U.S. PATENT DOCUMENTS

| | | | | |
|---|---|---|---|---|
| 348,284 A | * | 8/1886 | Horton | 172/247 |
| 885,205 A | * | 4/1908 | Ulrich | 301/44.3 |
| 1,128,337 A | * | 2/1915 | Luttrell | 172/544 |
| 1,473,519 A | | 11/1923 | Rolli | 172/180 |
| 1,537,262 A | | 5/1925 | Ray | 431/90 |
| 1,566,471 A | * | 12/1925 | Fretts | 172/532 |
| 4,703,809 A | | 11/1987 | Van den Ende | 172/147 |
| 4,865,132 A | | 9/1989 | Moore Jr. | 172/196 |
| 5,474,135 A | | 12/1995 | Schlagel | 172/151 |
| 5,632,343 A | | 5/1997 | Gengler | 172/552 |
| 5,797,460 A | | 8/1998 | Parker et al. | 172/151 |
| 5,964,300 A | | 10/1999 | Wattonville et al. | 172/700 |
| 6,068,061 A | | 5/2000 | Smith et al. | 172/139 |
| 6,763,896 B1 | * | 7/2004 | Hurtis | 172/149 |
| 6,843,047 B1 | * | 1/2005 | Hurtis | 56/249.5 |

* cited by examiner

*Primary Examiner*—Victor Batson
(74) *Attorney, Agent, or Firm*—Rebecca Henkel

(57) ABSTRACT

A soil conditioning rotary reel for secondary agricultural tillage implements is disclosed. The reel incorporates formed bars slightly spiraled along the length thereof that increase the overall strength of the reel and, because of the shape of the formed bars, support plates and end plates, efficiently break up clods while avoiding plugging of the reel, even in moist conditions.

7 Claims, 3 Drawing Sheets

SOIL CONDITIONING ROTARY REEL FOR SECONDARY TILLAGE OPERATIONS

CROSS-REFERENCE TO RELATED APPLICATION

This application is related to U.S. patent application Ser. No. 10/965244, filed simultaneously herewith and entitled "Soil Conditioning Rotary Reel for Primary Tillage Operations".

BACKGROUND OF THE INVENTION

The present invention relates generally to secondary tillage implements used in agriculture and, more specifically to a soil conditioning rotary reel for use behind secondary seedbed preparation tools. Another design is disclosed for use in primary tillage operations, i.e., such as behind primary tillage tools like chisel plows or heavy offset tandem discs.

As used herein, "primary tillage" refers to tillage where the ground working is deeper and the soil is turned, as for example, with moldboard and chisel plows, at depths greater than four inches. "Primary tillage" is distinguished, for example, from secondary tillage and various cultivation techniques such as disks, "spider" wheels and sweeps, as well as combinations of devices that normally cultivate the surface to nominal depths of two inches, but as deep as three to four inches. In general, primary tillage operations are performed on compacted soil after crop harvest, so such operations may advantageously create clods of larger size and less firming to maintain moisture content. On the other hand, secondary operations are directed toward the creation of an idealized seedbed, i.e., smaller clods, more soil firming and a smooth level surface.

For many years, harrows with either spikes or coil tines have been mounted to the rear of seedbed preparation tools to level and firm the soil and to promote moisture conservation. Similarly, in the past, for clod crushing and further firming, rollers with cast iron wheels have been pulled across the partially prepared seedbed. However, for medium and small clods, such equipment does not exhibit much soil-pulverizing action and additionally tends to push such clod(s) into the soil.

More recently, rotary pulverizing reels have been used that are from 10 to 14 inches in diameter. A series of bars are welded on a spiral lengthwise across the reel. These bars can be either rounds of approximately ¾ to 1 inch in diameter, or flat bars that are, for example, ¼×1½ inches. These units can be either pull-type, as an additional unit behind the secondary tillage machine, or mounted by arms to the rear of the secondary tillage machine. The bars are welded on in a slight spiral to avoid bumping and "chunking" through the field as it is pulled. As the bars come down to the soil there is a beating action caused by the edge of the bar striking the clod(s). As the reel bottoms out it also creates a firming action to the soil.

The flat bars are generally configured so there is an approximate 3–4 inch space between successive bars. The bars are also positioned on the reel so that if a straight edge is laid against the flat part of the bar the line of the straight edge will not go through the centerline of the reel. They are positioned in this way so that as they come down they provide more of a firming action on the soil and do not scoop the soil as they leave the rear side of the reel.

Furthermore, many types of drag harrows have been used behind primary tillage tools, such as moldboard and chisel plows, to break large clods and smooth out the soil surface. Chisel plows leave a large amount of residue near the surface. Harrows pull some of the partially buried residue out. They also bunch residue. Reels do not drag residue.

It would be a distinct advantage to have available a tool that breaks down clods and firms the soil, while avoiding the aforementioned problems and difficulties.

SUMMARY OF THE INVENTION

It is an object of the instant invention to provide a soil conditioning rotary reel that will provide improved soil firming and more clod breaking capability.

It is another object of the instant invention to provide a soil conditioning rotary reel wherein the bars are formed in such a way that, for example, in an eight-bar reel, both the inner and outer surfaces of the bars strike clods in the soil—providing and eight-bar reel with 16 clod crushing surfaces.

It is a further object of the instant invention to obtain the maximum amount of soil pulverizing and soil firming with a minimum amount of weight (since weight added to the back of secondary tillage tool is detrimental in that if too much is added the unit becomes hitch light.)

It is a further object of the instant invention to provide a soil conditioning rotary reel that provides improved soil firming characteristics, as desired under the operating conditions, with less down-pressure required from the mounting mechanism.

It is an even further object of the instant invention to provide a soil conditioning rotary reel with formed bars that require few support plates and are much stronger and resistant to bending when the reel strikes rocks or other field hazards/obstructions.

These and other objects features and advantages are obtained by providing a soil conditioning rotary reel for secondary agricultural tillage implements, the reel incorporating formed bars slightly spiraled along the length thereof that increase the overall strength of the reel and, because of the shape of the formed bars, support plates and end plates, efficiently break up clods while avoiding plugging of the reel, even in moist conditions.

DETAILED DESCRIPTION OF THE INVENTION

Figure 1:
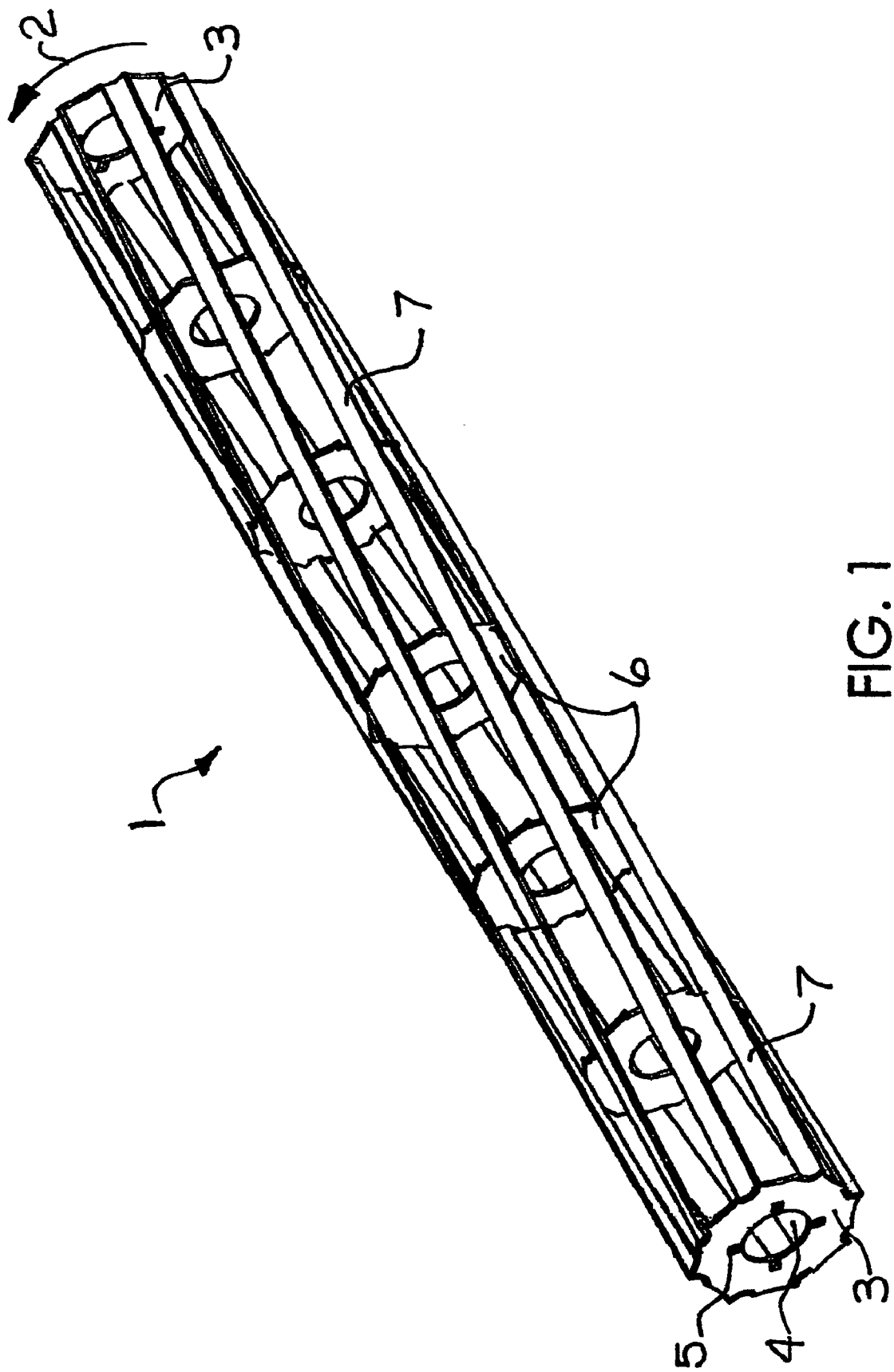
FIG. 1 is an elevated perspective view of a reel made in accordance with the principles of the instant invention.

Referring to FIG. 1, a perspective view of a reel 1, for use with secondary tillage implements, in accordance with the present invention can be seen. Arrow, 2 depicts the direction of rotation for maximum soil firming. The end plates, 3, provide a mount for the bearings, each with a center hole 4, providing placement for the bearings. Mounting holes, 5, are located generally around the center hole 4 in each end plate to allow for attachment of the bearings, by bolts, for instance. Intermediate support plates, 6, are generally evenly spaced along the longitudinal axis of reel 1 and supply support for the bars. Reel 1 is shown with five intermediate support plates; however, the actual number may vary, depending primarily on the length of the reel. Reel 1 is further shown with eight formed bars, 7; but, the reel can be made with more or less depending on the desired overall diameter and desired spacing between the bars.

Figure 2:
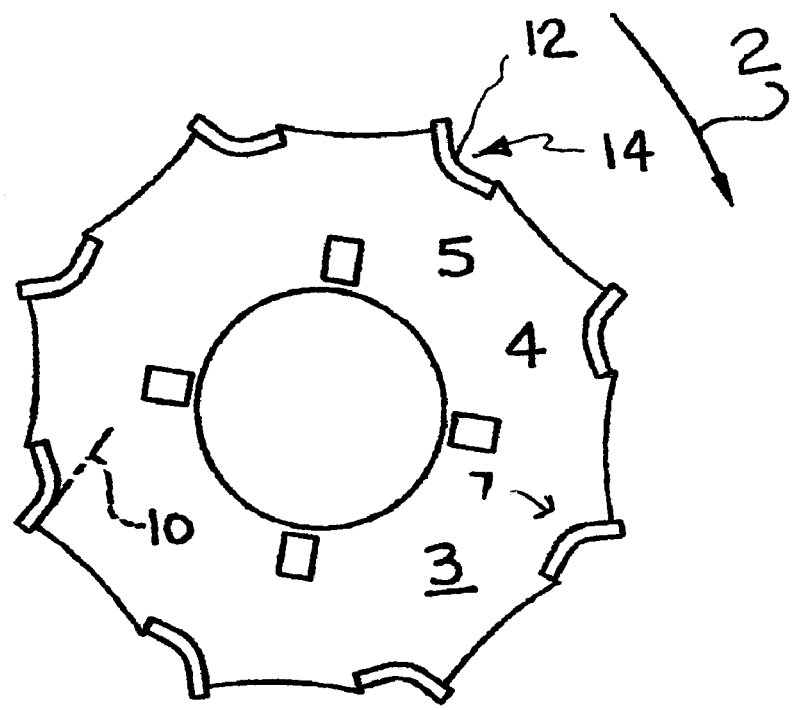
FIG. 2 is a left end view of the reel of FIG. 1, showing the bar orientation and bearing mounting plate.

Referring now to FIG. 2, the cross-sectional shape and the positioning of the formed bars 7 relative to the longitudinal axis of the reel 1 are more easily discernable. Dotted line 10 is a parallel line with the outer portion of the formed pulverizing bar 12. This position is similar to prior art reels with flat bars. The curved angular shape 14 provides firming to the soil. With the formed area 14 additional clod pulverizing is accomplished. Also, there is more soil firming for better seed/soil contact.

Figure 3:
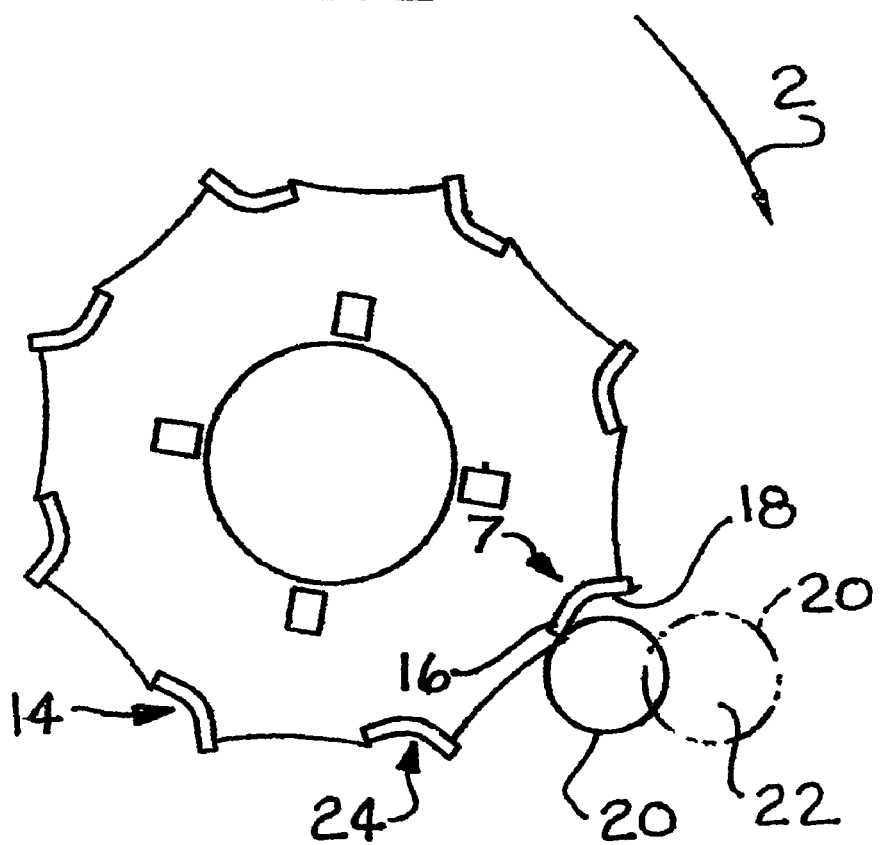
FIG. 3 is similar to FIG. 2 except it depicts a bar striking a clod.

Referring now to FIG. 3, one of the bars 7 is shown to have an inner portion 16 and an outer portion 18. A clod, 20, is shown being struck by portion 16. A dotted line clod, 22, is shown in a location that will cause it to be struck by portion 18 as the reel rotates forward (direction of arrow 2). Reel bar 24 is in a position so that the soil firming occurs as it rotates forward. This provides a broader firming action than a round bar or a flat bar.

If too much down pressure needs to be applied to the reel it can result in floating the secondary tillage machine out of the ground, especially the outer portion of the wings where the machine is lighter.

Figure 4:
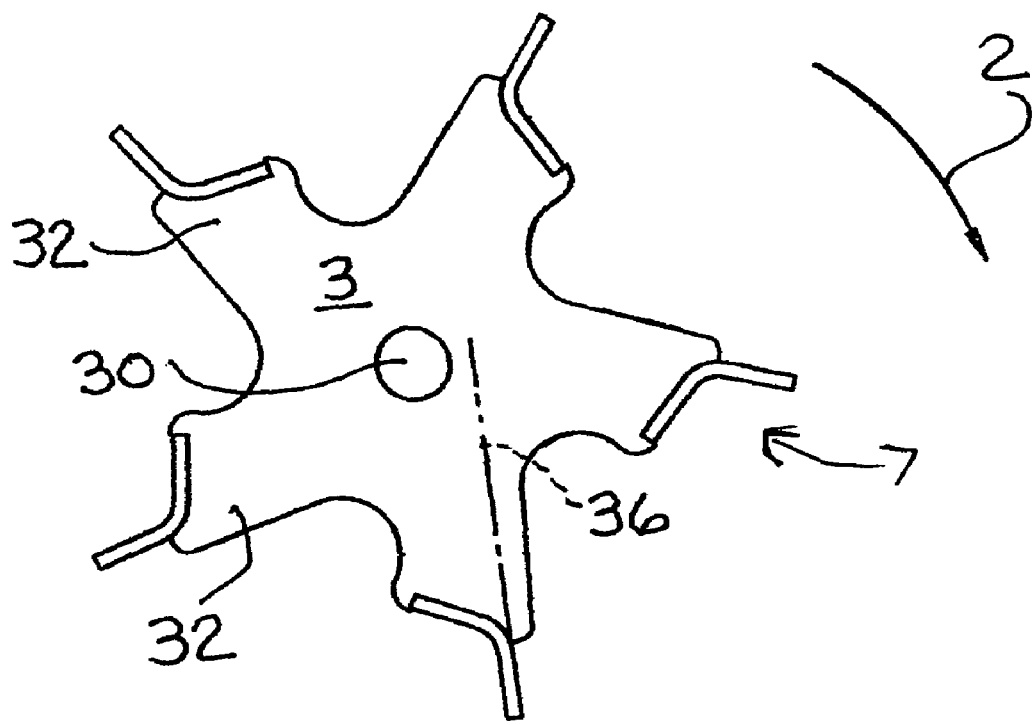
FIG. 4 is an end view of a larger, heavier primary tillage reel.

Looking at FIG. 4, an alternative embodiment for use behind a primary tillage tool, such as a chisel plow or heavy offset tandem disc can be viewed. The primary tillage tool reel support plates, 3, are attached to a shaft, 30. The area designated 32, is a protruding portion to which the bars, 7, are attached. The dashed line 36, to the right of the shaft 30, depicts the angle relative to the center shaft of the outer portion of the formed bars. This orientation of the formed bars results in a more aggressive chopping action into large chunks of soil and root crowns. Arrow 2 again depicts the direction of rotation.

Figure 5:
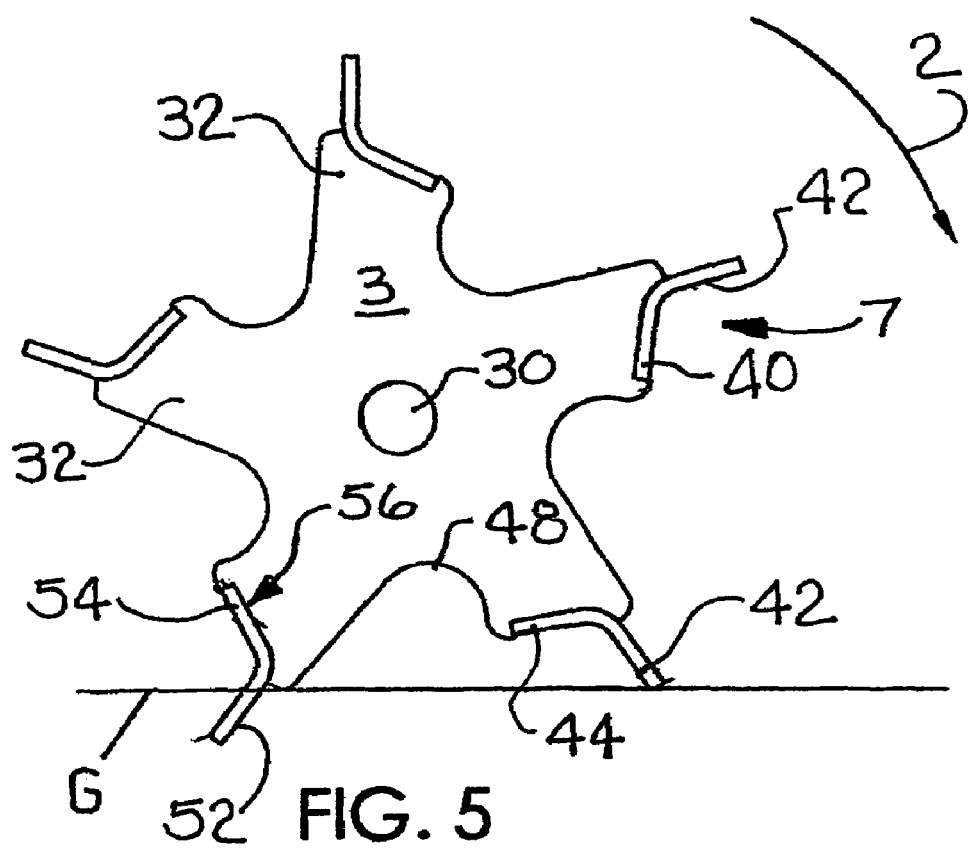
FIG. 5 is similar to FIG. 4; however, the reel is rotated to allow depiction of the bars as they rotate through the soil.

Ground line G in FIG. 5 is an idealized soil profile. The bars, 7, have an area designated 40. As the reel rotates in the direction of arrow 2, 40 will move down toward the idealized soil profile line, G. As it moves downwardly in the direction of rotation, area 40 will strike large clods and root crowns. As the reel continues to rotate, area 42 strikes the idealized soil line and reaches a point where it is lower than the area marked 44.

Area 44 is shown in a position where it is approximately horizontal, but it will rotate higher to a larger angle as it moves past shaft 30, while 42 rotates lower. It is important to note that moist soil that is being knifed into by 42 now cannot flow freely up into the center of the reel, causing plugging. The area designated 44 will resist soil movement along the inside surface of 42. Also, a notch, 48, is cut in the support plate so that there is minimal area for soil "stickage" as it flows off of 44. As the reel rotates forward and begins leaving the soil line G, the area designated 52 begins somewhat of a kicking motion and loosens soil that was firmed earlier by 44 when it was in the more horizontal position as 42 entered the soil. While 44 is in the near horizontal position and as it bottoms out, soil is restricted from entering the center of the reel, preventing plugging.

Again referring to 52, as the outer portion of the bar is now beginning to leave the soil profile, and while a slight kicking action results as it leaves the soil profile, area 54 is now in a near vertical position that is not firming soil. Area 56 does not have substantial contact with the soil even when some loose soil is above the idealized soil line G. The result is that as the reel rotates and each bar leaves the soil profile, firming action is minimized.

The result is that the large formed bars provide more soil movement and less firming than round or flat bars. With the outer bar orientation of line 36 on the right side (or forward travel side) rather than the left side (rearward of direction of travel) as shown on the secondary reel (FIGS. 2 and 3) less firming occurs on the primary reels.

The formed bar reel for use with primary tillage tools is a much heavier unit. For example, a reel may be constructed that is approximately 16 or 18 inches in diameter and may have five or six heavy, wide formed bars. These bars may be 5/16 or 3/8 inches thick and 3½ or 4 inches wide. Forming the wide, heavy bars results in two to three times more strength than a similar flat bar.

On primary tillage rotary reels the formed bars are oriented to provide more soil movement for soil leveling and less firming than the secondary reels or round or flat bars. Primary tillage tools are generally operated in the fall and soil firming in the fall is undesirable. Looser soil soaks up rainfall more quickly, reducing runoff. In the fall it is desirable for the bars to cut into large clods that are often the result of harvest compaction, and also root crowns to help smooth out high spots and knock soil out of root crowns so that it is easier to prepare the seed bed the following spring.

On primary tillage tools, many times the soil is very moist and operators must run in adverse conditions. For example, in using a bar 4 inches wide, the area 44, is slightly more than 2 inches if you include the bend radius, providing a substantial area to prevent soil flow to the center of the reel thereby preventing reel plugging.

The primary tillage reel is designed with larger bars with more space between the bars. The bars are positioned to avoid soil firming and avoid plugging with moist soil. Chisel plows often operate in wet fall conditions and also soil that may be frozen 1 to 3 inches. The primary rotary reel helps break compacted or frozen chunks of soil and smooth the surface.

Having thus described the preferred embodiments of the invention, what is claimed is:

1. In a soil conditioning rotary reel having a plurality of support plates spaced along an axial support shaft, and a plurality of bars affixed to said support plates to form a reel, the improvement comprising:

said support shaft has first and second opposing ends;

said plurality of generally support plates are circular and affixed to and uniformly spaced along the length of said support shaft, said plurality of support plates including two end plates, one adjacent to but spaced from each said first and second ends of said support shaft, each said support plate including a plurality of generally radially directed slots regularly spaced along the periphery thereof;

said plurality of elongate bars are affixed to each support plate, said bars having a formed transverse cross sectional shape and each fitting into one of said plurality of slots on each said support plate such that a relatively thin generally flat edge of the bar is directed generally radially outward;

each said bar containing a helical twist and said slots in said support plates positioned relative to one another on adjacent support plates such that said bars form a helical cutting edge across the width of the reel;

the angle of attack of each said bar is in the range of approximately 20 to 30 degrees to a line transverse to the direction of travel at 270 degrees, where 180 degrees is the direction of travel, 0 degrees is opposite the direction of travel, 90 degrees is upward and 270 degrees is toward the ground; and a generally inverted u-shaped support yoke affixed to said first and second ends of said support shaft such that said reel may rotate freely within the support yoke.

2. The improvement of claim 1, wherein:

the straight-line distance between adjacent bars is about four inches.

3. The improvement of claim 2, wherein:

the diameter of said support plates is approximately 10 inches, and the plurality of bars is eight.

4. The improvement of claim 3, wherein:

said rectangular cross-section of said bars is approximately 1.5 inches by approximately 0.250 inches.

5. The improvement of claim 4, wherein:

said plurality of support plates are positioned relative to each a distance in the range of approximately 12.5 inches to 18 inches.

6. The improvement of claim 5, further including;

an indexed tillage system having multiple transversely spaced row units along the width thereof, each said row unit including a longitudinal frame member; and said yoke is attached to said frame member such that a rotary reel trails each row unit.

7. A soil conditioning rotary reel comprising:

an elongate support shaft having first and second opposing ends;

a plurality of generally circular support plates rotatably affixed to and uniformly spaced along the length of said support shaft, said plurality of support plates including two end plates, one adjacent to each said first and second ends of said support shaft, each said support plate including a plurality of connection points regularly spaced along the periphery thereof;

a plurality of elongate bars affixed to each support plate, said bars each having a formed transverse cross-sectional shape with first and second generally flat portions at each side of a radial portion, and each bar affixed to one of said plurality of connection points on each said support plate such that a generally open face, comprising said radial portion and said first and second generally flat portions, faces generally outwardly;

a plane of said first portion of each said bar passing through the rearward travel side of said support shaft; and each said bar containing a helical twist and said connection points on said support plates positioned relative to one another on adjacent support plates such that said bars form a helical cutting edge across the width of the reel, wherein:

the gap between adjacent rotary reels, as measured from the ends of said bars, is less than the straight-line distance between two adjacent bars on a particular reel, wherein:

the angle of attack of each said bar is in the range of approximately 20 to 30 degrees to a line transverse to the direction of travel at 270 degrees, where 180 degrees is the direction of travel, 0 degrees is opposite the direction of travel, 90 degrees is upward and 270 degrees is toward the ground.

* * * * *